United States Patent
Doisneau

(10) Patent No.: US 10,047,255 B2
(45) Date of Patent: Aug. 14, 2018

(54) AQUEOUS ADHESIVE COMPOSITION FOR ADHESIVE BONDING

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: David Doisneau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 102 days.

(21) Appl. No.: 15/026,633

(22) PCT Filed: Oct. 2, 2014

(86) PCT No.: PCT/EP2014/071120
§ 371 (c)(1),
(2) Date: Apr. 1, 2016

(87) PCT Pub. No.: WO2015/049326
PCT Pub. Date: Apr. 9, 2015

(65) Prior Publication Data
US 2016/0237328 A1    Aug. 18, 2016

(30) Foreign Application Priority Data
Oct. 2, 2013   (FR) ..................... 13 59554

(51) Int. Cl.
| | | |
|---|---|---|
| *C09J 161/00* | (2006.01) | |
| *C09J 161/24* | (2006.01) | |
| *B01J 31/04* | (2006.01) | |
| *B27N 3/00* | (2006.01) | |
| *C09J 5/00* | (2006.01) | |
| *B01J 31/00* | (2006.01) | |
| *H04W 4/06* | (2009.01) | |

(52) U.S. Cl.
CPC .............. *C09J 161/24* (2013.01); *B01J 31/04* (2013.01); *B27N 3/00* (2013.01); *B27N 3/002* (2013.01); *C09J 5/00* (2013.01)

(58) Field of Classification Search
CPC ..... H04W 4/06; H04L 61/2007; C09J 161/00; B01J 31/00

USPC ........... 455/519, 520, 517, 466, 452.1, 509; 428/524
See application file for complete search history.

(56) References Cited

U.S. PATENT DOCUMENTS

| | | | |
|---|---|---|---|
| 2,325,105 A | 7/1943 | Bruson et al. | 260/6 |
| 2,413,624 A | 12/1946 | Harris | 260/39 |
| 2,834,705 A | 5/1958 | Marcucio et al. | 154/126.5 |
| 3,112,293 A | 11/1963 | Dickstein et al. | 260/65 |
| 3,365,468 A | 1/1968 | Feichtinger | 260/345.7 |
| 3,969,300 A | 7/1976 | Nagata et al. | 260/29.4 |
| 4,113,682 A | 9/1978 | Nagata et al. | 260/29.4 |
| 4,273,883 A | 6/1981 | Korf | 521/113 |
| 9,200,140 B2 | 12/2015 | Matsuo et al. | C08K 5/1535 |
| 2009/0004395 A1 | 1/2009 | Schneider et al. | 427/393 |
| 2009/0005504 A1 | 1/2009 | Schneider et al. | 524/612 |
| 2013/0287993 A1 | 10/2013 | Williamson et al. | 428/106 |
| 2014/0235124 A1 | 8/2014 | Doisneau et al. | 442/149 |
| 2014/0336331 A1 | 11/2014 | Matsuo et al. | 524/597 |

FOREIGN PATENT DOCUMENTS

| | | |
|---|---|---|
| GB | 468746 | 7/1937 |
| GB | 546373 | 7/1942 |
| WO | 2013/017421 A1 | 2/2013 |
| WO | 2013/065291 A1 | 5/2013 |
| WO | 2013/163245 A1 | 10/2013 |

*Primary Examiner* — Duc Truong
(74) *Attorney, Agent, or Firm* — Fitzpatrick, Cella, Harper & Scinto

(57) ABSTRACT

The aqueous adhesive composition comprises a resin based on at least one aromatic aldehyde bearing at least one aldehyde functional group, comprising at least one aromatic ring, and on at least one compound of formula (I):

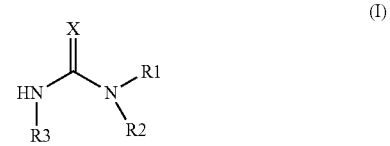

in which each group R1, R2 and R3 represents, independently of one another, an alkyl, aryl, arylalkyl, alkylaryl, cycloalkyl or hydrogen group, X represents S, O or N—R4, and R4 represents an alkyl, aryl, arylalkyl, alkylaryl or cycloalkyl group.

11 Claims, No Drawings

AQUEOUS ADHESIVE COMPOSITION FOR ADHESIVE BONDING

FIELD OF THE INVENTION

The present invention relates to aqueous adhesive compositions intended to cause elements to adhere to one another, to the use and to the process for the manufacture of such a composition, to the process for assembling the elements by means of these compositions and to the assemblies manufactured using these compositions.

RELATED ART

It has been known for a very long time to adhesively bond two elements, for example wooden elements, together using an aqueous adhesive composition. Several types of compositions are known, including a composition of urea/aldehyde type as described in the document "La colle caurite and son utilisation dans les industries du bois" [Urea/formaldehyde adhesive and its use in the wood-working industries] (A. Villière, ENEF Ecole National des Eaux et Forêts, Annales de l'école nationale des eaux et forêts et de la station de recherches et expériences [ISSN 0365-1827], 1942, Vol. 8, No. 2; pp. 207-279). This composition comprises a urea/aldehyde resin based on formaldehyde and urea.

This composition is used in a process for the adhesive bonding of articles made of wood. During this process, one or more elements made of wood is/are coated with a layer of the composition, the elements are joined to one another via the composition layer and the elements, thus joined, are cured. The adhesively bonded assemblage thus obtained exhibits a high cohesion by virtue of the excellent adhesive properties of the composition.

However, the use of formaldehyde, which furthermore is in excess with respect to the urea, results in the release of formaldehyde, not only during the curing but also during the storage and the use of the adhesively bonded assemblage. In point of fact, due to recent developments in regulations, in particular European regulations, with regard to this type of compound, it is desirable to limit as much as possible, indeed even to dispense with, the use of formaldehyde or formaldehyde precursor.

The aim of the invention is to provide an aqueous adhesive composition for adhesive bonding which exhibits elevated adhesive properties and which is devoid of formaldehyde.

In point of fact, during their research studies, the Applicant Companies have discovered an aqueous adhesive composition, not using formaldehyde, which makes it possible to achieve the above aim.

BRIEF DESCRIPTION OF EMBODIMENTS OF THE INVENTION

Thus, a first subject-matter of the invention relates to an aqueous adhesive composition comprising a resin based:
  on at least one aromatic aldehyde bearing at least one aldehyde functional group, comprising at least one aromatic ring, and
  on at least one compound of formula (I):

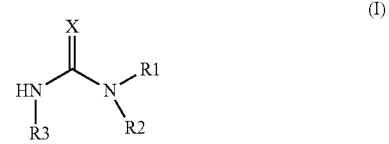

in which:
each group R1, R2 and R3 represents, independently of one another, an alkyl, aryl, arylalkyl, alkylaryl, cycloalkyl or hydrogen group, and
X represents S, O or N—R4, with R4 representing an alkyl, aryl, arylalkyl, alkylaryl or cycloalkyl group.

Another subject-matter of the invention relates to the use of an adhesive composition as defined above for the adhesive bonding of two elements and preferably for the adhesive bonding of two elements made of wood.

The invention also relates to a process for the manufacture of an aqueous adhesive composition as defined above in which the compound of formula (I) and the aromatic aldehyde are mixed in an aqueous solution.

The invention also relates to a process for the adhesive bonding of two elements, preferably of two elements made of wood, in which:
  a layer of the aqueous adhesive composition as defined above is applied to at least one of the two elements, and
  the two elements are joined to one another via the layer of the aqueous adhesive composition.

The invention also relates to an adhesively bonded assemblage of two elements, preferably of two elements made of wood, comprising a layer of the aqueous adhesive composition as defined above joining the two elements to one another.

The invention and its advantages will be easily understood in the light of the description and implementational examples which follow.

DETAILED DESCRIPTION OF THE INVENTION

I—Aqueous Adhesive Composition of the Invention

In the present description, unless expressly indicated otherwise, all the percentages (%) shown are % by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The expression "composition based on" should, of course, be understood as meaning a composition comprising the mixture and/or the reaction product of the various base constituents used for this composition, it being possible for some of them to be intended to react or are capable of reacting with one another or with their immediate chemical surroundings, at least partly, during the various phases of manufacture of the composition or of the assembling, in particular during a stage of curing, optionally under pressure.

I.1—Aromatic Aldehyde

The first essential constituent of the resin is an aromatic aldehyde bearing at least one aldehyde functional group and comprising at least one aromatic ring. Preferably, the aromatic ring of the aromatic aldehyde bears the aldehyde functional group.

Preferably, the aromatic aldehyde bears at least two aldehyde functional groups. More preferably still, the aromatic ring of the aromatic aldehyde bears two aldehyde functional groups, it being possible for the latter to be in the ortho, meta or para position on the aromatic ring. Completely unexpectedly, the presence of at least two aldehyde functional groups on the aromatic ring does not deactivate the reactivity of the aromatic ring, so that the reaction between the aromatic aldehyde and the compound of formula (I) is not impacted. Quite the opposite, the presence of two aldehyde functional groups on the aromatic ring makes possible a rapid reaction and makes it possible to obtain an aqueous adhesive composition which is at least as effective as, indeed even more effective than, that with an aromatic ring bearing just one aldehyde functional group.

Advantageously, the aromatic ring of the aromatic aldehyde is a benzene ring.

Preferably, the aromatic aldehyde is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and the mixtures of these compounds.

Preferably, the aromatic aldehyde is selected from the group consisting of 1,3-benzenedicarboxaldehyde, 1,4-benzenedicarboxaldehyde and the mixtures of these compounds.

More preferably still, the aromatic aldehyde used is 1,4-benzenedicarboxaldehyde, also known as terephthaldehyde, as a reminder of expanded chemical formula:

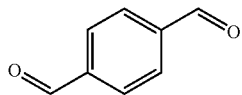

In other embodiments, the aromatic aldehyde exhibits the general formula (A):

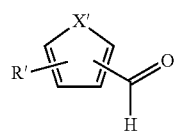

(A)

in which X' comprises N, S or O and R' represents —H or —CHO.

Such aromatic aldehydes result from renewable resources and not from oil. These aromatic aldehydes result, for example, from biobased materials or from conversion products of biobased materials.

Preferably, the aromatic aldehyde is of general formula (A'):

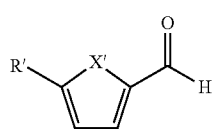

(A')

According to a preferred embodiment, X' represents O.

According to an alternative form of the aromatic aldehyde of general formula (A), X' represents O and R' represents —H. The aromatic aldehyde used is then of formula (B1):

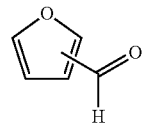

(B1)

In an alternative form of the aromatic aldehyde of general formula (A'), X' represents O and R' represents —H. The aromatic aldehyde used is then furfuraldehyde and is of formula (B'1):

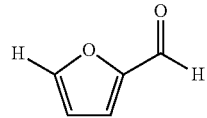

(B'1)

In another alternative form of the aromatic aldehyde of general formula (A), X' represents O and R' represents —CHO. The aromatic aldehyde used is then of formula (B2):

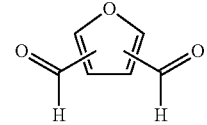

(B2)

In another alternative form of the aromatic aldehyde of general formula (A'), X' represents O and R' represents —CHO. The aromatic aldehyde used is then 2,5-furandicarboxaldehyde and is of formula (B'2):

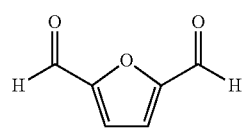

(B'2)

In another embodiment, X' comprises N.

In an alternative form of the aromatic aldehyde of general formula (A), X' represents NH. The aromatic aldehyde used is of formula (C1):

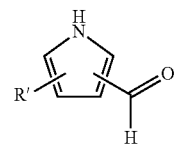

(C1)

In an alternative form of the aromatic aldehyde of general formula (A'), X' represents NH. The aromatic aldehyde used is of formula (C'1):

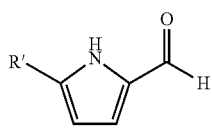
(C'1)

Preferably, R' represents —CHO in the alternative form of the aromatic aldehyde of formula (C'1) and the aromatic aldehyde obtained is then 2,5-1H-pyrroledicarboxaldehyde.

In another alternative form of the aromatic aldehyde of general formula (A), X' represents $NR_1'$ with $R_1'$ representing an alkyl, aryl, arylalkyl, alkylaryl or cycloalkyl group. The aromatic aldehyde used is of formula (C2):

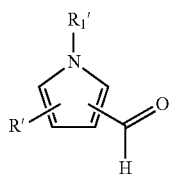
(C2)

In another embodiment, X' comprises S.

In an alternative form of the aromatic aldehyde of general formula (A), X' represents S. The aromatic aldehyde used is of formula (D1):

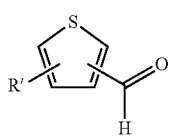
(D1)

In an alternative form of the aromatic aldehyde of general formula (A'), X' represents S. The aromatic aldehyde used is of formula (D'1):

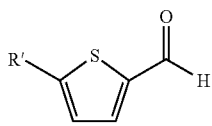
(D'1)

Preferably, R' represents —CHO in the alternative form of the aromatic aldehyde of formula (D'1) and is then 2,5-thiophenedicarboxaldehyde.

In another alternative form of the aromatic aldehyde of general formula (A), X' represents $SR_2'$ with $R_2'$ representing an alkyl, aryl, arylalkyl, alkylaryl or cycloalkyl group. The aromatic aldehyde used is of formula (D2):

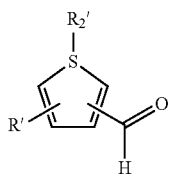
(D2)

In yet another alternative form of the aromatic aldehyde of general formula (A), X' represents $R_3'$—S—$R_2'$ with $R_2'$ and $R_3'$ representing, each independently of the other, an alkyl, aryl, arylalkyl, alkylaryl or cycloalkyl group. The aromatic aldehyde used is of formula (D3):

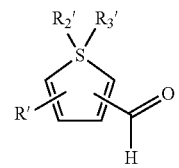
(D3)

In yet another alternative form of the aromatic aldehyde of general formula (A), X' represents S═O. The aromatic aldehyde used is of formula (D4):

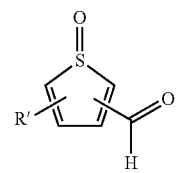
(D4)

In yet another alternative form of the aromatic aldehyde of general formula (A), X' represents O═S═O. The aromatic aldehyde used is of formula (D5):

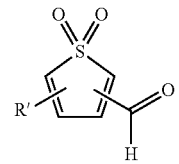
(D5)

Among the various embodiments described above, preference will be given to the embodiments and the alternative forms in which X' represents NH, S or O. In these embodiments and alternative forms, it will be possible to have, in accordance with the invention, R' representing —H or —CHO and preferably R' representing —CHO. In these embodiments and alternative forms, R' will preferably be in the 5 position and the —CHO group will preferably be in the 2 position on the aromatic ring (general formula (A')).

Preferably, when the resin is based on just one aromatic aldehyde, the composition is devoid of formaldehyde.

When the resin is based on several aldehydes, at least one of which is an aromatic aldehyde, each aldehyde is preferably different from formaldehyde. The composition is then also preferably devoid of formaldehyde.

In other words and preferably, the or each aldehyde of the resin is different from formaldehyde.

The term "devoid of formaldehyde" is understood to mean that the content by weight of formaldehyde, as total weight of the aldehyde(s), is strictly less than 1%.

In some embodiments, the composition can comprise formaldehyde. Preferably, the composition then comprises a content by weight of formaldehyde, as total weight of the aldehyde(s), of less than or equal to 10%, preferably of less than or equal to 5% and more preferably of less than or equal to 2%.

I.2—Compound of Formula (I)

The second essential constituent of the resin is a compound of formula (I):

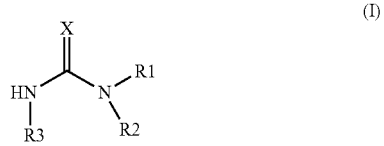

in which:
each group R1, R2 and R3 represents, independently of one another, an alkyl, aryl, arylalkyl, alkylaryl, cycloalkyl or hydrogen group, and
X represents S, O or N—R4, with R4 representing an alkyl, aryl, arylalkyl, alkylaryl or cycloalkyl group.

Preferably, R1 and/or R2 and/or R3 represents hydrogen.
Preferably, X represents O.
More preferably, the compound of formula (I) is urea of formula (I') below:

Urea can result from renewable resources. In addition, it is plentiful and particularly inexpensive.

I.3—Additives

Advantageously, the aqueous adhesive composition comprises less than 16% (value excluded) by weight of unsaturated diene elastomer latex. The term "percentage by weight of the composition" is understood to mean the percentage by weight of the total composition, that is to say weight of latex to weight of the dry constituents plus weight of the water.

Preferably, the composition comprises at most 10%, preferably at most 5% and more preferably at most 1% by weight of unsaturated diene elastomer latex.

Unsaturated diene elastomer (that is to say, bearing carbon-carbon double bonds) latexes are well known to a person skilled in the art. It should be remembered that a latex is a stable dispersion of microparticles of elastomer(s) in suspension in an aqueous solution.

The unsaturated diene elastomer of the latex present in an amount of less than 16% by weight is preferably selected from the group consisting of polybutadienes, butadiene copolymers, polyisoprenes, isoprene copolymers and the mixtures of these elastomers. It is more preferably still selected from the group consisting of butadiene copolymers, vinylpyridine/styrene/butadiene terpolymers, natural rubber and the mixtures of these elastomers.

"Diene" elastomer (or, without distinction, rubber) is understood to mean an elastomer resulting at least in part (that is to say, a homopolymer or copolymer) from diene monomer(s) (i.e., monomer(s) bearing two conjugated or nonconjugated carbon-carbon double bonds). "Isoprene elastomer" is understood to mean an isoprene homopolymer or copolymer, in other words a diene elastomer selected from the group consisting of natural rubber (NR), synthetic polyisoprenes (IRs), various isoprene copolymers and the mixtures of these elastomers.

In one embodiment, the aqueous adhesive composition comprises at least one acid. The acid is, for example, a strong acid or an organic acid. The molar amount of acid is between 5 and 20% of the molar amount of compound of formula (I).

The aqueous adhesive composition can, of course, comprise all or a portion of the additives normal for aqueous adhesive compositions. Mention will be made, for example, of colorants, fillers, antioxidants or other stabilizers. Mention will also be made of the additives which make it possible to modify the open time of the resin and the setting time of the resin.

Preferably, the situation $1 \leq nf.na/nu \leq 3$ exists, with of being the number of aldehyde functional group(s) borne by the aromatic aldehyde, na being the number of moles of aromatic aldehyde and nu being the number of moles of the compound of formula (I).

II—Process for the Manufacture of the Aqueous Adhesive Composition of the Invention Typically, during a first manufacturing stage, an aqueous solution is prepared by mixing water, the compound of formula (I), the aromatic aldehyde and an acid, for example hydrochloric acid.

The mixture thus formed is stirred for 30 to 90 min, for example 60 min, at 40° C. On conclusion of this stirring time, the resin thus condensed exhibits the appearance of an off-white gel.

In one embodiment, the aqueous adhesive composition is obtained directly and can be used immediately. In another embodiment, a base is added, so as to neutralize the acid and to obtain a precondensed resin, in order to be able to store it and to use it subsequently.

The concentration of the composition can be adjusted as a function of its specific use (open time, viscosity). Thus, the composition can be used immediately or else stored for a maturing time which can typically vary from one to several hours, indeed even several days, before its final use.

III—Adhesively Bonded Assemblage of the Invention

As indicated above, the present invention also relates to the use of the aqueous adhesive composition described above for the adhesive bonding of two elements, preferably of two elements made of wood.

Thus, an adhesively bonded assemblage of two elements, preferably of two elements made of wood, according to the invention comprises a layer of the aqueous adhesive composition as described above joining the two elements to one another.

When the adhesive according to the invention is used for the adhesive bonding of wood, "wood" is understood to mean the plant tissue resulting from ligneous plants. Examples of plant tissue are the trunk, branches and roots. For example, the ligneous plants from which the plant tissue results are oak, chestnut, ash, walnut, beech, poplar, fir, pine, olive, alder or birch.

The adhesive can also be used for the adhesive bonding of elements made of materials other than wood, for example plastics, for example thermosetting or thermoplastic materials, metal, textiles, inorganic substances or the mixtures of these materials, including with wood.

"Element" is understood to mean any monolithic piece or particle. Examples of elements made of wood are plies intended to form a plywood assemblage, lathwork intended to form a lathed assemblage, particles, such as chips, sawdust, flour or flakes, in order to form a chipboard assemblage, whether or not the particles are oriented, fibres intended to form an assembly of fibres, such as a high- or medium-density panel, pieces of solid wood, also known as timber, intended to form assemblages, such as furniture or frames.

IV—Process for the Manufacture of the Adhesively Bonded Assemblage of the Invention The adhesively bonded assemblage of the invention can be prepared according to a process for the adhesive bonding of two elements, preferably of two elements made of wood, in which:

a layer of the aqueous adhesive composition as described above is applied to at least one of the two elements, and
the two elements are joined to one another via the layer of the aqueous adhesive composition.

The stage of application of the adhesive composition to one of the or the elements can be carried out according to any appropriate method, in particular by any known coating technique, such as, for example, spraying, impregnation or injection under pressure or by a combination of one or more of these techniques.

In one embodiment, a curing agent is added to the aqueous adhesive composition subsequent to the stage of application of the layer of the aqueous adhesive composition. In another embodiment, a curing agent is added to the aqueous adhesive composition prior to the stage of application of the layer of the aqueous adhesive composition. In another embodiment, the curing agent is applied to at least one of the two elements prior to the stage of application of the layer of the aqueous adhesive composition.

Advantageously, a curing agent is used when a precondensed resin is used.

The curing agent is preferably a strong acid, an organic acid or a weak base. Mention will be made, for example, of hydrochloric acid or organic acids, such as a citric acid or ascorbic acid. Mention will also be made, as curing agent, of ammonium salts or also hexamethylenetetramine. In a preferred embodiment, in which it is desired to avoid the use of formaldehyde or formaldehyde precursor, the use of hexamethylenetetramine will be avoided.

Use may preferably be made of a content of aqueous adhesive composition ranging from 50 to 250 gr·m$^{-2}$.

After the stage of application of the adhesive composition, the adhesively bonded assemblage is heated at a temperature ranging from 30° C. to 200° C., preferably from 80° C. to 160° C., according to the applications targeted and according to the heating time, which itself can vary from a few minutes to several hours.

Preferably, the adhesively bonded assemblage is kept under pressure, for example of between 1 and 150 kg·cm$^{-2}$. More preferably, the stage of keeping it under pressure is carried out simultaneously with the heating stage.

The duration of the heating stage, the heating temperature and/or the pressure used vary as the case may be, in particular according to the temperature/pressure pair used.

V—Examples of the Implementation of the Invention and Comparative Tests

These tests demonstrate that the adhesion between several elements, in this instance elements made of wood, joined via a layer of aqueous adhesive composition according to the invention is substantially equivalent, indeed even improved, in comparison with the adhesion obtained with a conventional adhesive composition using formaldehyde.

For this, several aqueous adhesive compositions were prepared as indicated above, one in accordance with the invention (denoted C-2 hereinafter) and one not in accordance with the invention (control composition hereinafter denoted C-1). Their formulations (expressed by weight) are presented in the appended Table 1. The amounts listed in this table are those of the constituents in the dry state. For the preparation of these compositions, use was respectively made of 15 g and 30 g of water for each composition C-1 and C-2.

Composition C-1 is a control composition known from the state of the art commonly used for adhesive bonding. This adhesive composition is based on formaldehyde and urea.

Composition C-2 comprises an aromatic aldehyde comprising at least one aromatic ring bearing at least one aldehyde functional group. In the case in point, the aromatic ring is a benzene ring in this instance carrying two aldehyde functional groups.

The aromatic aldehyde of the composition C-2 is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and the mixtures of these compounds. The aromatic aldehyde of the composition C-2 is 1,4-benzenedicarboxaldehyde.

Composition C-2 comprises a compound of formula (I):

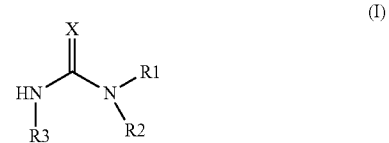

in which:
each group R1, R2 and R3 represents, independently of one another, an alkyl, aryl, arylalkyl, alkylaryl, cycloalkyl or hydrogen group, and
X represents S, O or N—R4, with R4 representing an alkyl, aryl, arylalkyl, alkylaryl or cycloalkyl group.

The compound of formula (I) of composition C-2 is urea (R1=R2=R3=H and X=O).

Each adhesive composition C-1 and C-2 comprises an acid, in this instance hydrochloric acid.

The quality of the bonding between the elements is determined by a test in which the flexural breaking force necessary to cause a test specimen to break, thus indicating the level of cohesion of the elements of the latter, is measured.

More specifically, each test specimen comprises 30 g of fir wood chips having a density equal to 1.7 g·cm$^{-3}$ and each adhesive composition C-1 and C-2 (3 g of dry extract). Each test specimen exhibits a cylindrical general shape with a diameter of 10 cm and a thickness of 0.5 cm. Each test specimen is manufactured by heating at 140° C. under 5 bar of pressure for 45 minutes.

On conclusion of the curing, each test specimen is subjected to a flexural test of three-point type well known to a person skilled in the art.

The level of adhesion is characterized by measuring the flexural breaking force (denoted $F_{max}$) for causing the test specimen to break. A value greater than that of the control test specimen, arbitrarily set at 100, indicates an improved result, that is to say a flexural breaking force greater than that of the control test specimen. The results of the tests carried out on the test specimens are summarized in Table 1.

It is found that the assemblage adhesively bonded with adhesive composition C-2 according to the invention exhibits a breaking force $F_{max}$ which is substantially equivalent to, even slightly greater than, the reference breaking force measured on the control assemblage adhesively bonded with composition C-1.

In conclusion, the results of these various tests clearly demonstrate that the adhesive compositions according to the invention constitute an advantageous alternative to the use of the conventional adhesive compositions, this being the case without the use of formaldehyde.

TABLE 1

|  | Adhesive compositions | |
| --- | --- | --- |
|  | C-1 | C-2 |
| Aldehyde |  |  |
| Formaldehyde (1) | 4.3 | — |
| 1,4-Benzenedicarboxaldehyde (2) | — | 12.52 |
| Compound of formula (I) |  |  |
| Urea (3) | 5.7 | 7.48 |
| Acid |  |  |
| Hydrochloric acid (4) | 0.28 | 0.15 |
| Total weight of adhesive composition dry extract | 3 | 3 |
| Adhesion tests |  |  |
| $F_{max}$ at 20° C. | 100 | 102 |

(1) Formaldehyde (from Caldic; diluted to 36%)
(2) 1,4-Benzenedicarboxaldehyde (from ABCR; of 98% purity)
(3) Urea (from Sigma-Aldrich, of 100% purity)
(4) Hydrochloric acid (from Sigma-Aldrich, diluted to 37%)

The invention claimed is:

1. An aqueous adhesive composition comprising a resin based on:
   at least one aromatic aldehyde selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and mixtures thereof, and
   at least one compound of formula (I):

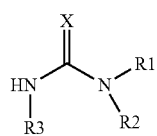

(I)

wherein each group R1, R2 and R3 represents, independently of one another, an alkyl, aryl, arylalkyl, alkylaryl, cycloalkyl or hydrogen group,
wherein X represents S, O or N—R4, and
wherein R4 represents an alkyl, aryl, arylalkyl, alkylaryl or cycloalkyl group.

2. The composition according to claim 1, wherein the at least one aromatic aldehyde is selected from the group consisting of 1,3-benzenedicarboxaldehyde, 1,4-benzenedicarboxaldehyde and mixtures thereof.

3. The composition according to claim 2, wherein the at least one aromatic aldehyde is 1,4-benzenedicarboxaldehyde.

4. The composition according to claim 1, wherein R1 represents hydrogen.

5. The composition according to claim 1, wherein R2 represents hydrogen.

6. The composition according to claim 1, wherein R3 represents hydrogen.

7. The composition according to claim 1, wherein X represents O.

8. A process of manufacturing the aqueous adhesive composition according to claim 1, the process comprising the step of:
   mixing the compound of formula (I) and the at least one aromatic aldehyde in an aqueous solution.

9. The process for the adhesive bonding of two elements, the process comprising the steps of:
   applying a layer of the aqueous adhesive composition according to claim 1 to at least one of the two elements, and
   joining the two elements to one another via the layer of the aqueous adhesive composition.

10. An adhesively bonded assemblage of two elements comprising a layer of the aqueous adhesive composition according to claim 1 joining the two elements to one another.

11. An aqueous adhesive composition comprising a resin based on 1,4-benzenedicarboxaldehyde and urea, wherein the composition is devoid of formaldehyde, and wherein, upon curing, the composition provides an adhesive bonding force which is at least equivalent to that of a composition comprising a resin based on formaldehyde and urea.

* * * * *